(12) United States Patent
Seiller

(10) Patent No.: US 11,603,077 B2
(45) Date of Patent: Mar. 14, 2023

(54) WINDSCREEN WIPER DEVICE

(71) Applicant: TRICO PRODUCTS CORPORATION, Rochester Hills, MI (US)

(72) Inventor: Guillaume Seiller, Ribeauville (FR)

(73) Assignee: TRICO BELGIUM SA, Aubange (BE)

( * ) Notice: Subject to any disclaimer, the term of this patent is extended or adjusted under 35 U.S.C. 154(b) by 0 days.

(21) Appl. No.: 15/762,335

(22) PCT Filed: Sep. 24, 2015

(86) PCT No.: PCT/EP2015/072026
§ 371 (c)(1),
(2) Date: Mar. 22, 2018

(87) PCT Pub. No.: WO2017/050381
PCT Pub. Date: Mar. 30, 2017

(65) Prior Publication Data
US 2018/0272994 A1      Sep. 27, 2018

(51) Int. Cl.
*B60S 1/40*     (2006.01)
*B60S 1/38*     (2006.01)

(52) U.S. Cl.
CPC ............. *B60S 1/4087* (2013.01); *B60S 1/386* (2013.01); *B60S 1/3849* (2013.01); *B60S 1/3867* (2013.01); *B60S 1/3879* (2013.01)

(58) Field of Classification Search
CPC .... B60S 1/4083; B60S 1/4087; B60S 1/3867; B60S 1/3849; B60S 1/386; B60S 1/3879;
(Continued)

(56) References Cited

U.S. PATENT DOCUMENTS 3,725,970 A * 4/1973 Allaria ..................... B60S 1/40
15/250.32
4,094,039 A * 6/1978 Waterman ................ B60S 1/40
15/250.32
(Continued)

FOREIGN PATENT DOCUMENTS

EP      1681216 A1      7/2006
FR      2982819    *    5/2013

*Primary Examiner* — Gary K. Graham
(74) *Attorney, Agent, or Firm* — Bryan Cave Leighton Paisner LLP

(57) ABSTRACT

A windscreen wiper device (1) of the flat blade type comprising an elastic, elongated carrier element, as well as an elongated wiper blade (2) of a flexible material, which can be placed in abutment with a windscreen to be wiped, which wiper blade includes at least one groove (3), in which groove a longitudinal strip (4) of the carrier element is disposed, which windscreen wiper device comprises a connecting device (6) for an oscillating arm (7), wherein the oscillating arm can be pivotally connected to the connecting device about a pivot axis (11) near one end, the connecting device comprising at least two parts (8, 9) provided with protrusion/hole means arranged for pivotally and detachably connecting the parts together through a snapping operation, wherein the first part is retained onto the wiper blade and wherein the second part comprises a channel arranged for inserting the oscillating arm therein, wherein the windscreen wiper device is provided with retaining means arranged for retaining the connecting device onto the oscillating arm, wherein the retaining means comprises at least one upwardly extending protrusion (13) on the second part, wherein the protrusion is movable relative to the second part between an inward position, wherein in mounted position the protrusion engages into a correspondingly shaped hole (15) provided in the oscillating arm and the connecting device is retained onto the oscillating arm, and an outward position, wherein in
(Continued)

dismounted position the protrusion disengages from the hole provided in the oscillating arm and the connecting device is released from the oscillating arm.

8 Claims, 5 Drawing Sheets

(58) Field of Classification Search
CPC .... B60S 1/4006; B60S 1/4009; B60S 1/4016; B60S 2001/4022
USPC .................................................. 15/250.32
See application file for complete search history.

(56) References Cited

U.S. PATENT DOCUMENTS

| | | | |
|---|---|---|---|
| 2008/0066254 A1* | 3/2008 | Vacher | B60S 1/3848 15/250.32 |
| 2014/0000056 A1* | 1/2014 | Bratec | B60S 1/3867 15/250.32 |
| 2015/0166016 A1 | 6/2015 | Wang | |
| 2015/0217729 A1 | 8/2015 | Friscioni | |

\* cited by examiner

WINDSCREEN WIPER DEVICE

BACKGROUND

1. Technical Field

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, which windscreen wiper device comprises a connecting device for an oscillating arm, wherein the oscillating arm can be pivotally connected to the connecting device about a pivot axis near one end. Ends of the longitudinal strip may be connected by a respective connecting piece, also called "end cap".

2. Related Art

Such a windscreen wiper device is generally known. This prior art windscreen wiper device is designed as a "yokeless" wiper device or "flat blade", wherein no use is made of several yokes pivotally connected to each other, but wherein the wiper blade is biased by the carrier element, as a result of which it exhibits a specific curvature.

In practice it has become apparent that, during use of the known windscreen wiper device, high forces are exerted on the connection between the connecting device and the oscillating arm. As a consequence thereof the wiper blade may get loose from the oscillating arm.

SUMMARY

The object of the invention is to provide a windscreen wiper device, wherein the connecting device and the oscillating arm are connected in an improved, reliable manner, using a minimum of parts. Thereto, a windscreen wiper device of the type referred to in the introduction is characterized according to the invention in that the connecting device comprises at least two parts provided with protrusion/hole means arranged for pivotally and detachably connecting the parts together through a snapping operation, wherein the first part is retained onto the wiper blade and wherein the second part comprises a channel arranged for inserting the oscillating arm therein, wherein the windscreen wiper device is provided with retaining means arranged for retaining the connecting device onto the oscillating arm, wherein the retaining means comprises at least one upwardly extending protrusion on the second part, wherein the protrusion is movable relative to the second part between an inward position, wherein in mounted position the protrusion engages into a correspondingly shaped hole provided in the oscillating arm and the connecting device is retained onto the oscillating arm, and an outward position, wherein in dismounted position the protrusion disengages from the hole provided in the oscillating arm and the connecting device is released from the oscillating arm. The second part is mounted pivotally relative to the first part so as to enable the wiper blade to follow any curvatures of a windscreen to be wiped, without the risk that, in a downward or wiping position of the oscillating arm, the wiper blade unintentionally can get loose from the oscillating arm. However, in an upright or service position of the oscillating arm, the second part can be pivoted further relative to the first part (i.e. under a larger angle than in the downward position of the oscillating arm), forcing the upwardly extending protrusion to move, preferably to hinge, in the outward position, thereby releasing the unit consisting of the wiper blade and the connecting device from the oscillating arm. Hence, the inward position of the protrusion (relative to the hole of the oscillating arm) corresponds to a normal working angle between the wiper blade and the oscillating arm in the wiping position of the oscillating arm, and the outward position of the protrusion (relative to the hole of the oscillating arm) corresponds to an extended angle between the wiper blade and the oscillating arm in the service position of the oscillating arm.

Preferably, the first part and the second part are each made of one piece of plastic. The first and second parts preferably are the only parts forming the connecting device. Preferably, the oscillating arm has a rod-like extension to be inserted inside the channel of the second part of the connecting device.

The first and second parts are connected through a snapping operation, wherein preferably vertical side walls of the first part are allowed to deform elastically or plastically, in order to clip the parts together, using the protrusion/hole means.

It is noted that the present invention is not restricted to the use of only one longitudinal strip that is particularly located in a central, channel forming groove of the wiper blade. Instead, the carrier element may comprise two, spaced-apart longitudinal strips forming the elastic, elongated carrier element, wherein the strips are disposed in opposing longitudinal grooves on longitudinal sides of the wiper blade. In the latter case the connecting device may be welded, soldered, brazed or glued to the longitudinal strips. In the former case, the connecting device may be welded, soldered, brazed or glued to an elastomeric material, such as rubber, of the wiper blade.

In a preferred embodiment of a windscreen wiper device in accordance with the invention the second part comprises a lever provided with the protrusion, wherein the lever is hingeable between the inward position and the outward position. Particularly, the first part comprises a stop surface arranged to force the lever to hinge from the inward position into the outward position upon pivoting the second part relative to the first part until the lever abuts the stop surface on the first part. In other words, by rotating the wiper blade around the extremity of the oscillating arm, the second part is allowed to pivot relative to the first part until the lever abuts the stop surface on the first part in order to force the protrusion in the outward position. The windscreen wiper device may then be released from the oscillating arm. When the second part is subsequently pivoted back, the lever is forced to hinge from the outward position into the inward position, for example by the elasticity of the material used for the lever or by a part, for example a bottom, of the first part. More in particular, the lever is hingeable along hinges of the second part located near opposite side walls of the second part and on opposite sides of the oscillating arm in mounted position thereof, i.e. on opposite sides of the channel arranged for inserting the oscillating arm therein.

The second part and the lever are preferably made of one piece. When the first and the second part are snapped together, the lever is preferably not visible from the outside.

In another preferred embodiment of a windscreen wiper device according to the invention the retaining means form first retaining means, and wherein the windscreen wiper device is further provided with second retaining means arranged for retaining the connecting device onto the oscillating arm, wherein the second retaining means comprises at least one protrusion provided on the first part arranged to engage the oscillating arm. Preferably, the protrusion on the first part is arranged to engage into a recess provided on a longitudinal side of the oscillating arm. In the alternative, the protrusion on the first part is arranged to engage into a hole having a closed circumference provided in the oscillating arm.

In another preferred embodiment of a windscreen wiper device in accordance with the invention the protrusion on the first part is located near an insertion opening of the channel arranged for inserting the oscillating arm therein. In other words, the recess provided on a longitudinal side of the oscillating arm is located at a larger distance to the free end of the oscillating arm than the hole in the oscillating arm cooperating with the protrusion on the second part. Accordingly, mounting or dismounting the connecting device onto or from the oscillating arm can be effected at a certain pivot angle of the oscillating arm relative to the first part.

The present invention also refers to a wiper arrangement of a windscreen wiper device in accordance with the invention and an oscillating arm connected thereto. Particularly, for mounting or dismounting the connecting device onto or from the oscillating arm, the second part of the windscreen wiper device and the free end of the oscillating arm connected thereto are arranged to be pivoted relative to the first part of the windscreen wiper device in order to engage or disengage the protrusion on the first part into or from the recess on the longitudinal side of the oscillating arm. This can, of course, only be done when also the protrusion on the second part in all embodiments is engaged into or disengaged from the hole in the oscillating arm.

THE DRAWINGS

The invention will now be explained in more detail with reference to figures illustrated in a drawing, wherein FIG. 1A is a schematic and perspective view, partly in exploded view, of a main part of a windscreen wiper device according to the invention, wherein a first part and a second part of a connecting device of the windscreen wiper device is shown arranged to be connected to an oscillating arm:

Figure 3A:
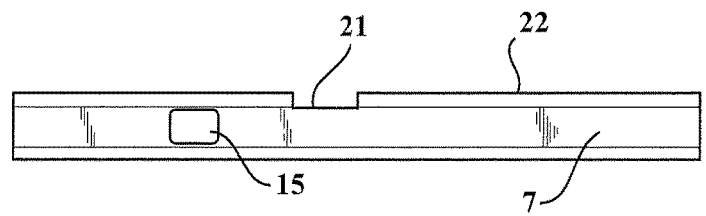
Figure 3B:
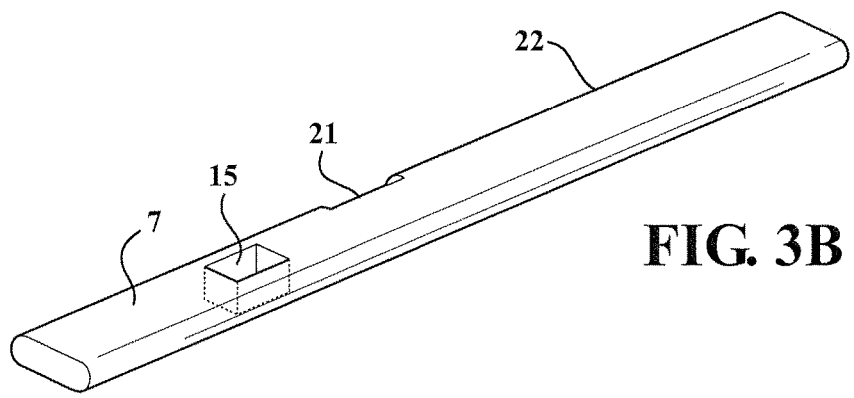
Figure 3C:
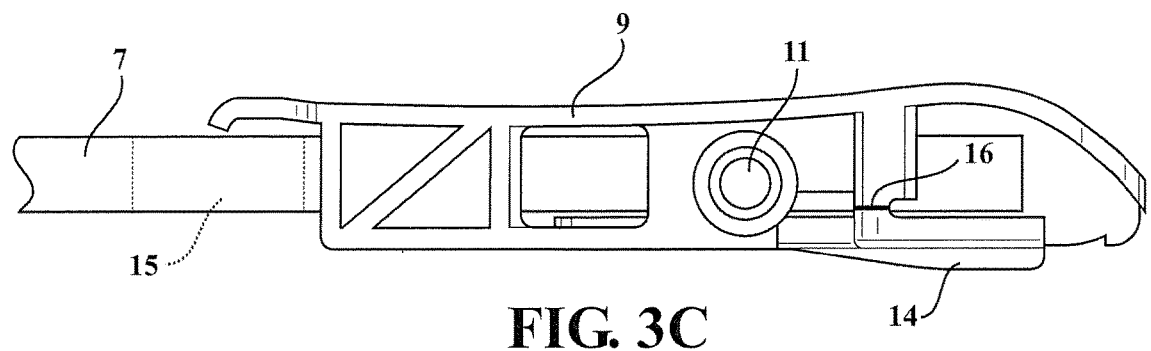
Figure 3D:
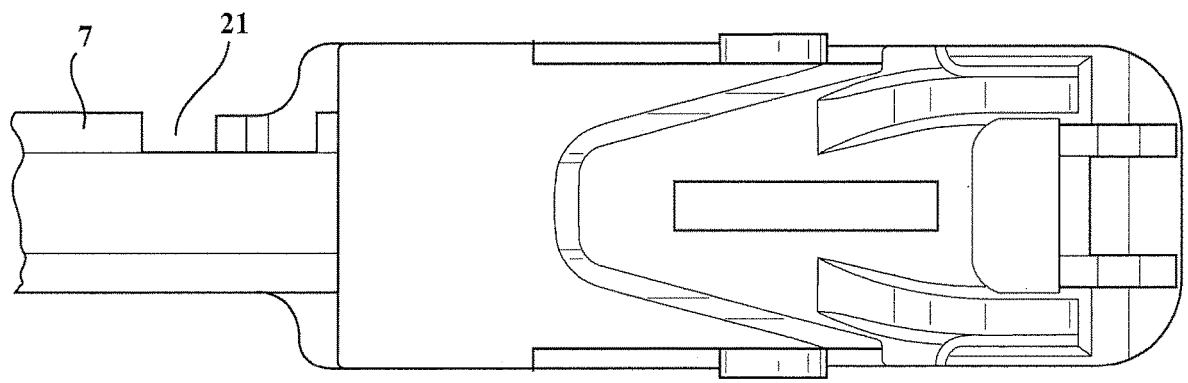
Figure 4A:
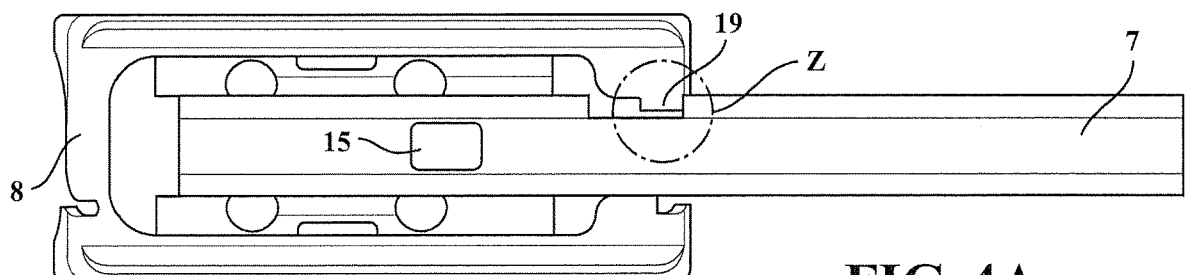
Figure 4B:
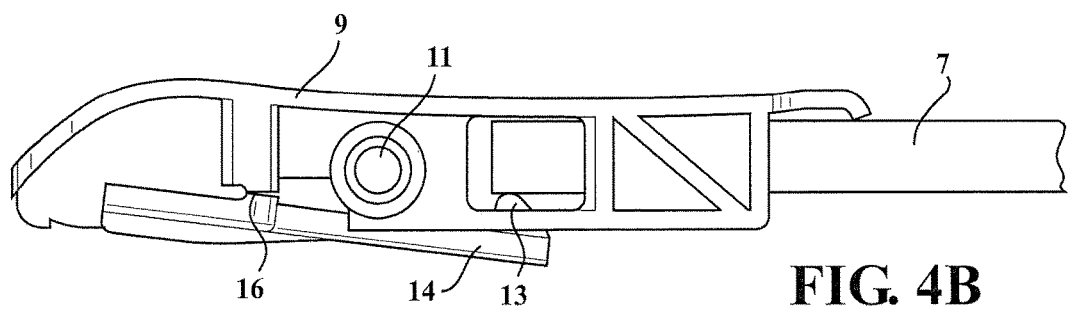
Figure 4C:
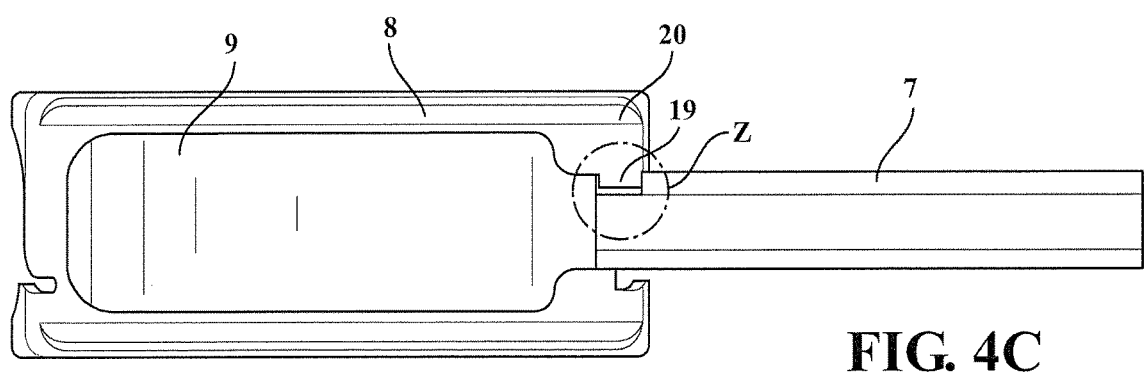

FIG. 3A is a top view and a side view of the connecting device and the oscillating arm in assembled position, as well as a top view of the oscillating arm, whereas FIG. 3B is a perspective view of the oscillating arm; and FIG. 4A are top views of the connecting device and the oscillating arm in assembled position, with and without the second part, respectively, whereas FIG. 4B is a side view of the second part and the oscillating arm in the process of insertion.

DETAILED DESCRIPTION

Figure 1A:
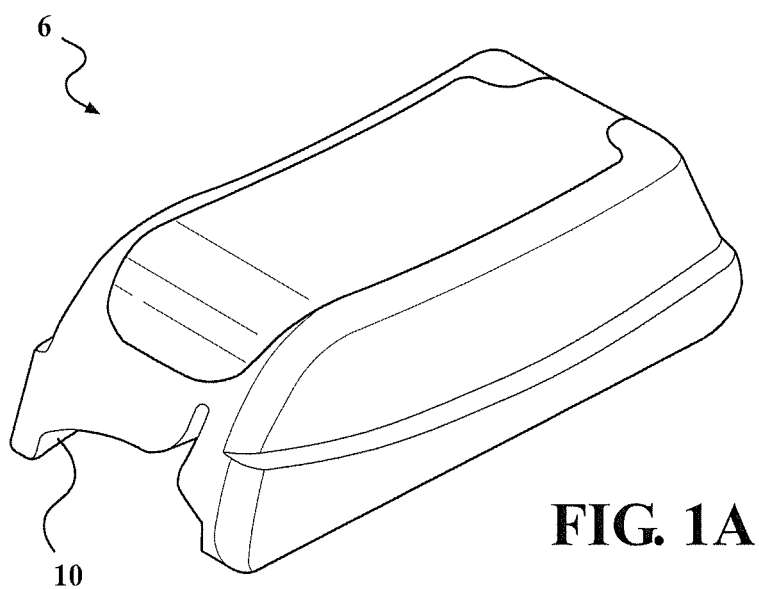
FIG. 1B are schematic and perspective views of the windscreen wiper device, wherein the oscillating arm is inserted inside and outside the second part of the connecting device of FIG. 1A, respectively.
Figure 1B:
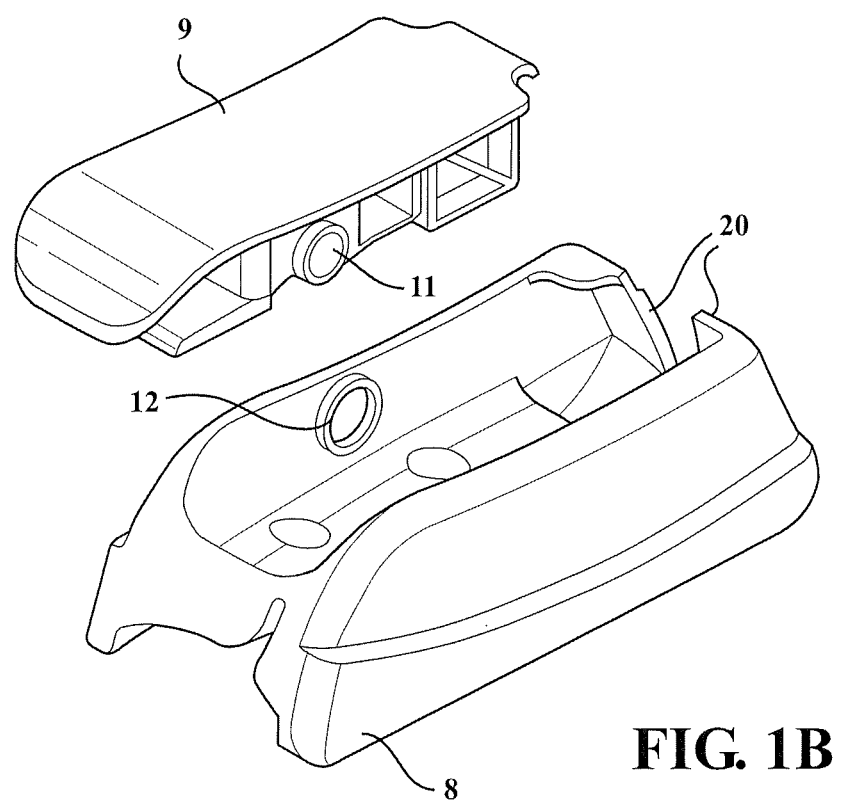
Figure 1C:
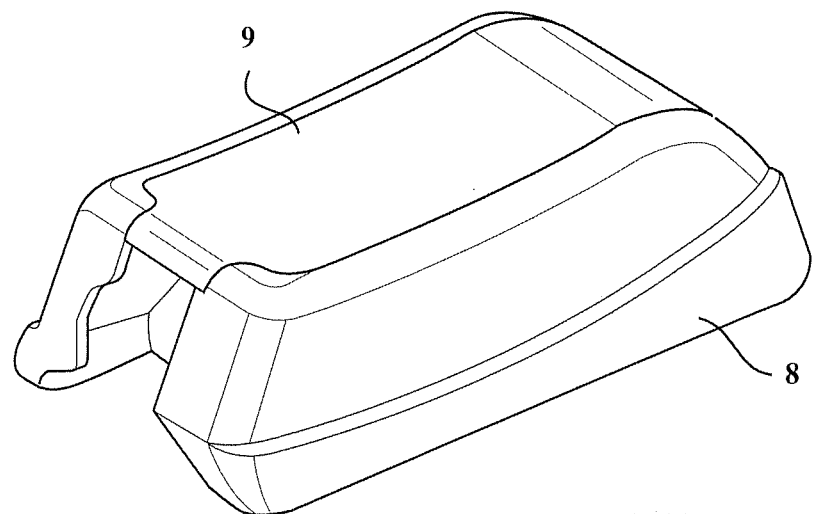
Figure 1D:
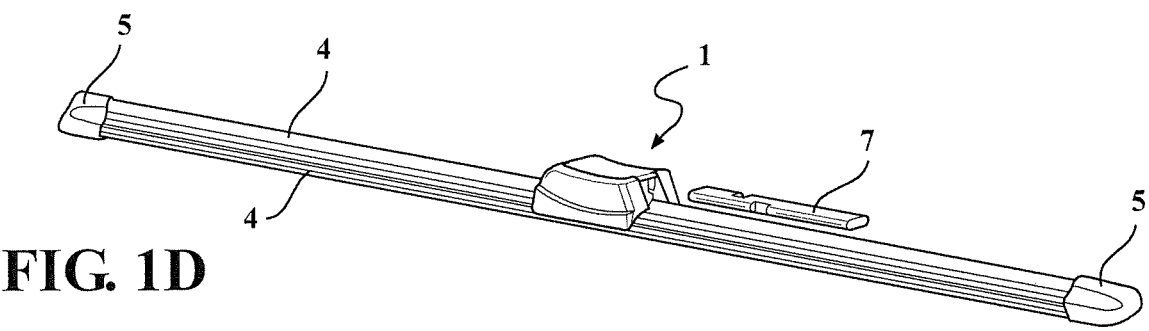
Figure 1E:
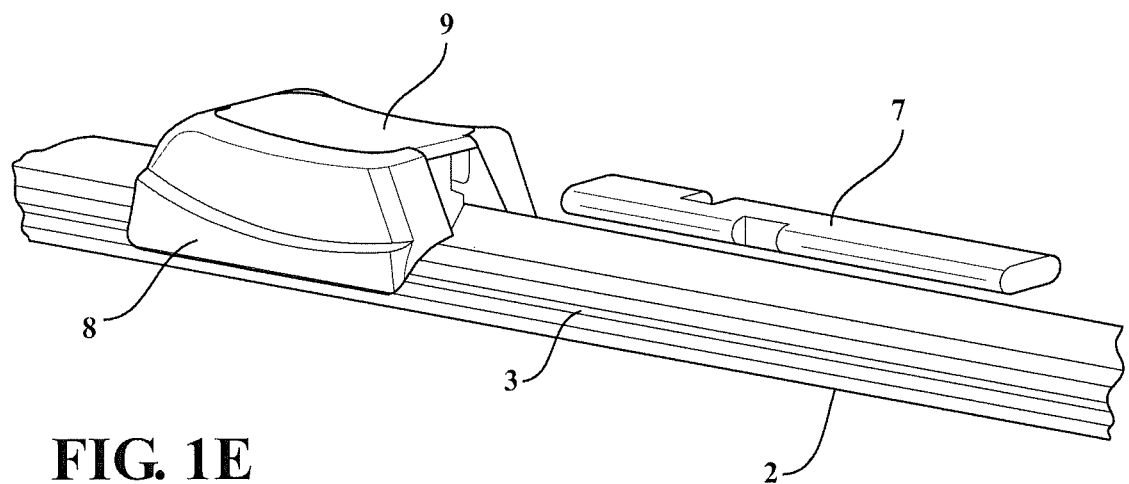

FIGS. 1A and 1B show a windscreen wiper device 1 of the "flat blade" type according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighbouring ends of strips 4 are interconnected on either side of the windscreen wiper device 1 by means of connecting pieces 5 or "end caps" functioning as clamping members. In this embodiment, the connecting pieces may be separate constructional elements, which may be form-locked ("positive locking" or "having positive fit"), as well as force-locked to the ends of strips 4. In another preferred variant, the connecting pieces are in one piece with the strips 4 made of spring band steel. In the latter case the connecting pieces form transverse bridges for the strips 4, as it were. Possibly, a spoiler is furthermore provided.

The windscreen wiper device 1 is furthermore built up of a connecting device 6 of plastic material for an oscillating wiper arm 7. The wiper arm 7 is finalized by a rod-like extension (without an adapter). Connecting device 6 consists of a first part 8 and a second part 9 detachably and pivotally connected together. The first part 8 is retained onto the wiper blade 2, whereas the second part 9 is positioned within the first part 8, that is between parallel, upright walls thereof. Further, the first part 8 comprises clamping members 10 that are integral therewith, which engage round longitudinal sides of the strips 4 that face away from each other, as a result of which the connecting device 6 is firmly attached to the unit consisting of wiper blade 2 and strips 4. The second part 9 has a U-shaped cross-section at the location of its connection to the first part 8. The oscillating wiper arm 7 is pivotally connected to the connecting device 6 about a pivot axis near a free end thereof, and that in the following manner.

With reference to FIGS. 1 and 2, the second part 9 comprises two cylindrical protrusions 11 (only one is visible) extending outwards on either side of the second part 9, that is on each vertical side wall of its U-shaped, rectangular or square cross-section. These protrusions 11 pivotally engage in identically shaped cylindrical holes 12 (only one thereof is visible in FIGS. 1 and 2) of the first part 8, the protrusions 11 act as bearing surfaces at the location of a pivot axis in order to pivot the second part 9 (and the oscillating wiper arm 7 attached thereto) about the pivot axis near a free end of the arm 7. The protrusions 11 are preferably in one piece with the second part 9. In the alternative, the protrusions 11 are part of a single pivot pin perpendicular to the connecting device 6.

Referring to FIGS. 1, 2 and 3, the second part 9 comprises a protrusion 13 extending upwardly from a free end of a lever 14 inside the second part 9, while the oscillating arm 7 has an identically shaped hole 15 with a closed circumference at the location of its connection to the second part 9. The lever 14 with the protrusion 13 is hingeable relative to the second part 9 between an inward position (see FIG. 2A), wherein in a mounted position the protrusion 13 engages into the hole 15 provided in the oscillating arm 7 in order to retain the connecting device 6 onto the oscillating arm 7, and an outward position (FIG. 2C), wherein in a dismounted position the protrusion 13 disengages from the hole 15 provided in the oscillating arm 7, allowing the connecting device 6 to be released from the oscillating arm 3. As shown, the lever 14 is hingeable along two lateral hinges 16 located near opposite side walls of the second part 9 and on opposite sides of the oscillating arm 7, upon pivoting a unit consisting of the wiper blade 2 and the connecting device 6 relative to the oscillating arm 7 by hand in the direction of arrow 17.

Figure 2A:
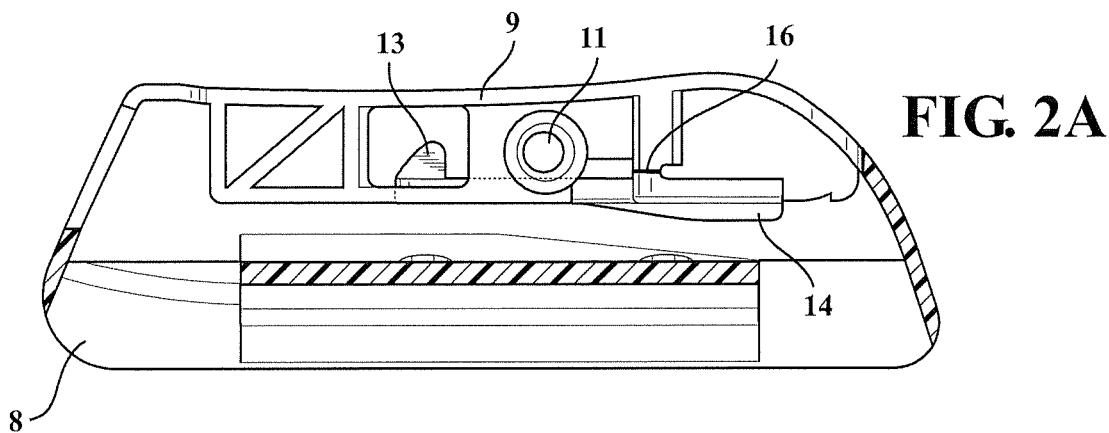
FIGS. 2A through 2D are side views of the first part and the second part of the connecting device shown in FIG. 1A, explaining in steps how to retain and to release a unit consisting of a wiper blade and the connecting device on and from the oscillating arm, respectively.
Figure 2B:
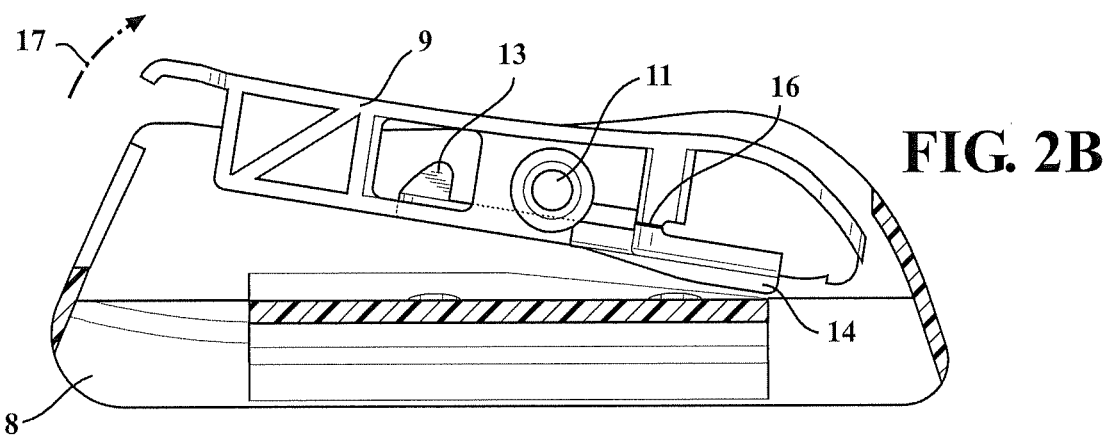
Figure 2C:
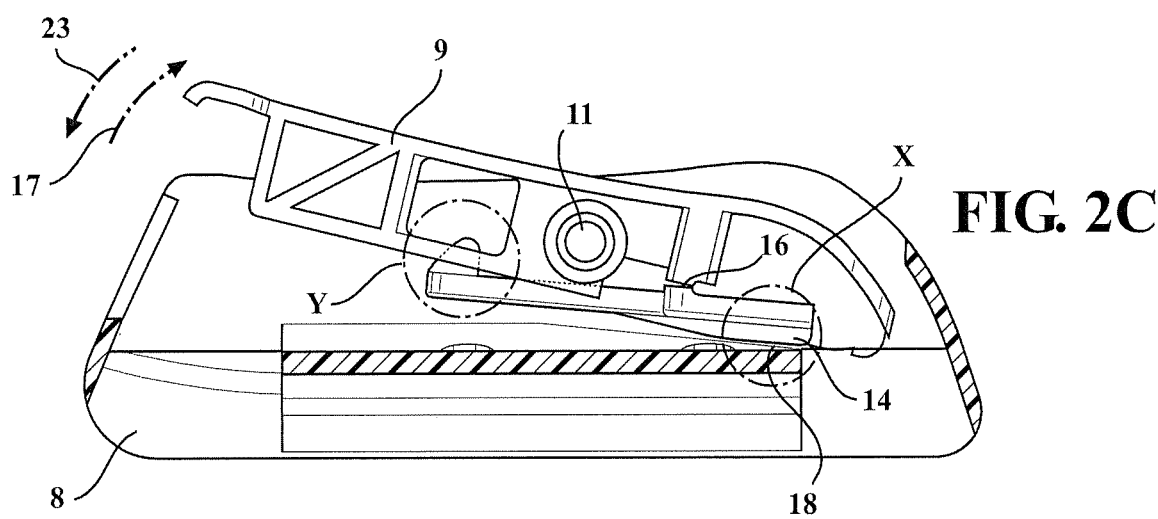
Figure 2D:
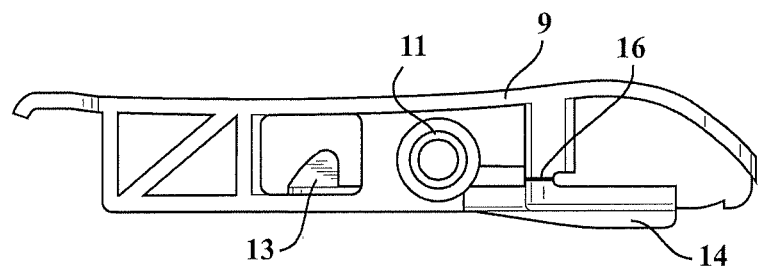

More in particular, by pivoting a unit consisting of the wiper blade 2 and the connecting device 6 relative to the oscillating arm 7 by hand in the direction of arrow 17 from the position of FIG. 2A into the position of FIG. 2C, a free end of the lever 14 opposite to its other free end with the protrusion 13, will abut a bottom part 18 of the first part 8, as shown in detail in the encircled part X of FIG. 2C. As a consequence thereof, the protrusion 13 of the lever 14 will disengage the hole 15 of the oscillating arm 7, as shown in detail in the encircled part Y of FIG. 2C. The above unit consisting of the wiper blade 2 and the connecting device 6 may then be released from the oscillating arm 7 by hand. In the same position of FIG. 2C the above unit consisting of the wiper blade 2 and the connecting device 6 may then be mounted on the oscillating arm 7 by hand. Namely, by pivoting the unit consisting of the wiper blade 2 and the connecting device 6 relative to the oscillating arm 7 by hand in the direction of arrow 23 from the position of FIG. 2C into the position of FIG. 2A, due to its resiliency the lever 14 will hinge from its outward position (FIG. 2C) into its inward position (FIG. 2A). The protrusion 13 will then engage the hole 15 of the oscillating arm. The unit is then safely retained onto the oscillating arm 7. The hinges 16 are invisible from the outside when the first and second parts 8,9 are interconnected.

The protrusion 13 on the second part 9 and the hole 15 in the oscillating arm 7 are meant for retaining the connecting device 6 onto the oscillating arm 7 and are therefore called "first retaining means". However, in case the first retaining means would disfunction, for example when the protrusion 13 would not properly fit into the hole 15, the second part 9 and the first part 8 connected thereto would be able to move relative to the oscillating arm 7 in longitudinal direction of the wiper blade 2. In order to avoid the wiper blade 2 from coming loose, with all negative consequences involved, second retaining means are provided for. With reference to FIGS. 3A, 3B and 4A the second retaining means consist of a sidewardly extending protrusion 19 on at least one of parallel, upright walls 20 of the first part 8 cooperating with a recess 21 in the oscillating arm 7, as shown in detail in the encircled part Z of FIG. 4A. Reference is also made to FIGS. 3A and 3B. In other words, the protrusion 19 engages into the correspondingly shaped recess 21 provided on a longitudinal (exterior) side 22 of the oscillating arm 7. The protrusion 19 may also be called a cam.

For mounting or dismounting the connecting device 6 onto or from the oscillating arm 7, the second part 9 and thus the free end of the oscillating arm 7 connected thereto is pivoted relative to the first part 8 (FIG. 7). While carrying out the pivot movement the protrusion or cam 19 is no longer in line with the recess 21 and cannot mutually cooperate any longer, so that the second part 9 and the first part 8 attached thereto can be released from the oscillating arm 7. This can, of course, only be done when also the protrusion 13 in all embodiments is released from the hole 15.

Although not shown in FIG. 1, but fully understood by a skilled person, the oscillating arm 7 is connected to a mounting head fixed for rotation to a shaft driven by a small motor. In use, the shaft rotates alternately in a clockwise and in a counter-clockwise sense carrying the mounting head into rotation also, which in turn draws the oscillating arm 7 into rotation and by means of the connecting device 6 moves the wiper blade 2.

The invention is not restricted to the variants shown in the drawing, but it also extends to other embodiments that fall within the scope of the appended claims.

The invention claimed is:

1. A windscreen wiper device comprising an elastic, elongated carrier element, as well as an elongated wiper blade made of a flexible material, which can be placed in abutment with a windscreen to be wiped, which wiper blade includes at least one groove, in which groove a longitudinal strip of the carrier element is disposed, which windscreen wiper device comprises a connecting device for an oscillating arm, wherein said oscillating arm can be pivotally connected to said connecting device about a pivot axis near one end, and wherein said connecting device comprises at least two parts provided with protrusion/hole cooperating features arranged for pivotally and detachably connecting said parts together through a snapping operation, wherein a first part is retained onto the wiper blade and wherein a second part comprises a channel arranged for inserting said oscillating arm therein, wherein said windscreen wiper device is provided with retaining structure arranged for retaining said connecting device onto said oscillating arm, wherein said retaining structure comprises at least one upwardly extending protrusion on the second part, wherein said protrusion is movable relative to the second part between an inward position, wherein in a mounted position said protrusion engages into a correspondingly shaped hole provided in said oscillating arm and said connecting device is retained onto said oscillating arm, and an outward position, wherein in a dismounted position said protrusion disengages from said hole provided in said oscillating arm and said connecting device is released from said oscillating arm, and wherein said second part comprises a lever provided with said protrusion, and wherein said lever is hingeable between said inward position and said outward position, wherein said first part comprises a stop surface arranged to force said lever to hinge from said inward position into said outward position upon pivoting said second part relative to said first part until said lever abuts said stop surface on said first part.

2. A windscreen wiper device according to claim 1, wherein said lever is hingeable along hinges of said second part located near opposite side walls of said second part and on opposite sides of said oscillating arm in mounted position thereof.

3. A windscreen wiper device according to claim 1, wherein the second part is positioned within said first part, and wherein a top wall of said second part forms a top wall of said connecting device.

4. A windscreen wiper device according to claim 1, wherein said retaining structure includes first retaining structure, and wherein said windscreen wiper device is further provided with second retaining structure arranged for retaining said connecting device onto said oscillating arm, wherein said second retaining structure comprises at least one protrusion provided on the first part arranged to engage the oscillating arm.

5. A windscreen wiper device according to claim 4, wherein said protrusion on the first part is arranged to engage into a recess provided on a longitudinal side of the oscillating aria.

6. A windscreen wiper device to claim 4 or 5, wherein said protrusion on the first pan is located near an insertion opening of said channel arranged for inserting said oscillating arm therein.

7. A wiper arrangement of a windscreen wiper device according to claim 1 in combination with an oscillating arm connected thereto.

8. A wiper arrangement according to claim 7 provided with a windscreen wiper device according to claim 4, wherein for mounting or dismounting said connecting device onto or from said oscillating arm, the second part of said windscreen wiper device and the free end of said oscillating arm connected thereto are arranged to be pivoted relative to said first part of said windscreen wiper device in order to disengage the protrusion on the first part from the recess on the longitudinal side of said oscillating arm.

\* \* \* \* \*